United States Patent
Mainka et al.

(10) Patent No.: US 9,963,859 B2
(45) Date of Patent: May 8, 2018

(54) SANITARY FITTING WITH TWO VALVES

(71) Applicant: Grohe AG, Hemer (DE)

(72) Inventors: David Mainka, Iserlohn (DE); Felix Hamer, Iserlohn (DE)

(73) Assignee: Grohe AG, Hemer (DE)

( * ) Notice: Subject to any disclaimer, the term of this patent is extended or adjusted under 35 U.S.C. 154(b) by 0 days. days.

(21) Appl. No.: 15/183,138

(22) Filed: Jun. 15, 2016

(65) Prior Publication Data

US 2016/0362876 A1    Dec. 15, 2016

(30) Foreign Application Priority Data

Jun. 15, 2015  (DE) .................... 10 2015 007 456

(51) Int. Cl.
| | |
|---|---|
| *F16K 11/22* | (2006.01) |
| *E03C 1/05* | (2006.01) |
| *E03C 1/04* | (2006.01) |
| *F16K 31/06* | (2006.01) |
| *E03C 1/02* | (2006.01) |

(52) U.S. Cl.
CPC ............ *E03C 1/057* (2013.01); *E03C 1/04* (2013.01); *E03C 1/0412* (2013.01); *F16K 31/06* (2013.01); *E03C 2001/026* (2013.01)

(58) Field of Classification Search
CPC ............................ E03C 1/057; F16K 19/006
USPC ............ 137/599.03, 599.05, 599.11, 599.12, 137/601.14, 613
See application file for complete search history.

(56) References Cited

U.S. PATENT DOCUMENTS

| | | | | |
|---|---|---|---|---|
| 4,709,728 A * | 12/1987 | Ying-Chung | ......... | F16K 11/078 137/597 |
| 4,962,790 A * | 10/1990 | Chou | ...................... | E03C 1/057 137/599.08 |
| 5,205,313 A * | 4/1993 | Moretti | ................... | F16K 35/14 137/112 |
| 6,019,130 A * | 2/2000 | Rump | ..................... | E03C 1/057 137/601.01 |
| 8,365,767 B2 * | 2/2013 | Davidson | .............. | E03C 1/0404 137/559 |
| 8,474,481 B2 * | 7/2013 | Huang | .................... | E03C 1/055 137/599.03 |
| 8,863,774 B2 * | 10/2014 | Wang | ...................... | E03C 1/057 137/599.11 |
| 9,010,377 B1 | 4/2015 | O'Brien et al. | | |
| 2008/0072965 A1* | 3/2008 | Buechel | ................. | E03C 1/057 137/218 |

(Continued)

FOREIGN PATENT DOCUMENTS

| | | |
|---|---|---|
| DE | 10 2005 001 310 A1 | 7/2006 |
| GB | 2 248 469 A | 4/1992 |

*Primary Examiner* — Reinaldo Sanchez-Medina
(74) *Attorney, Agent, or Firm* — Muncy, Geissler, Olds & Lowe, P.C.

(57) ABSTRACT

A sanitary fitting having a housing with at least one mixing unit for mixing a cold water and a hot water into a mixed water, wherein the mixed water can be directed through a first flow path and a second flow path to a spout of the housing, and wherein the first flow path can be at least partially closed by a first valve and the second flow path can be at least partially closed by a second valve, so that an outflow of the mixed water from the spout can be controlled by means of the first valve and the second valve independently from one another.

6 Claims, 3 Drawing Sheets

(56) References Cited

U.S. PATENT DOCUMENTS

| | | | |
|---|---|---|---|
| 2008/0099088 A1* | 5/2008 | Boey | E03C 1/057 |
| | | | 137/624.11 |
| 2010/0170570 A1 | 7/2010 | Rodenbeck et al. | |
| 2013/0248019 A1* | 9/2013 | Frick | E03C 1/04 |
| | | | 137/468 |
| 2014/0345726 A1 | 11/2014 | Seggio et al. | |
| 2015/0233100 A1* | 8/2015 | Loeck | G05D 23/1313 |
| | | | 4/623 |

* cited by examiner

SANITARY FITTING WITH TWO VALVES

This nonprovisional application claims priority under 35 U.S.C. § 119(a) to German Patent Application No. 10 2015 007 456.3, which was filed in Germany on Jun. 15, 2015, and which is herein incorporated by reference.

BACKGROUND OF THE INVENTION

Field of the Invention

The present invention relates to a sanitary fitting, for example in the manner of a mixer tap or mixing fitting, which in particular is used for mixing cold water and hot water into mixed water at a desired mixed water temperature. The most common use for sanitary fittings is, for example, on washbasins, sinks, showers, and/or bathtubs.

Description of the Background Art

A sanitary fitting with two shutoff valves is known from US 2010/0170570 A1, for example. A first shutoff valve is a manual valve that can be operated conventionally by means of a lever of the sanitary fitting. The second shutoff valve is electronically controlled and can be operated by means of a capacitive sensor. Consequently, a water flow can be activated either conventionally by means of the mechanical lever, or by simply touching the sanitary fitting. It is a disadvantage of this sanitary fitting that the first shutoff valve must be manually opened by the lever for activation of the water flow by means of the capacitive sensor. Consequently, the water flow cannot be activated by means of the capacitive sensor independently of the first shutoff valve.

SUMMARY OF THE INVENTION

It is therefore an object of the invention to at least partially solve the problems described with reference to the prior art, and in particular to specify a sanitary fitting with which improved water flow and simpler operation are made possible. In this regard, the sanitary fitting should be of the most robust and compact construction possible as well as being economical to manufacture.

The sanitary fitting has a housing with at least one mixing unit for mixing cold water and hot water into mixed water, wherein the mixed water can be directed through a first flow path and a second flow path to a spout of the housing, and wherein the first flow path can be at least partially closed by a first valve and the second flow path can be at least partially closed by a second valve, so that an outflow of the mixed water from the spout can be controlled by means of the first valve and the second valve independently from one another.

The sanitary fitting can be designed in the manner of a mixer tap or mixing fitting, for example, and is used in particular on washbasins, sinks, showers, and/or bathtubs. The sanitary fitting has a housing with at least one mixing unit for mixing cold water and hot water into mixed water. In particular, the housing is made at least partially of metal, such as a brass alloy, for example. The at least one mixing unit is supplied with cold water through a cold water inlet and with hot water through a hot water inlet. The cold water has, in particular, a temperature of 0° C.-40° C., and/or the hot water a temperature of 40° C.-90° C. The cold water and the hot water are mixed in the at least one mixing unit into a mixed water at a desired mixed water temperature. Proceeding from the at least one mixing unit, the mixed water is directed through a first flow path and a second flow path to a spout of the housing of the fitting. The first flow path and/or the second flow path can be, for example, passages in the fitting housing or (hose) lines routed in the housing. The first flow path can be closed at least partially (in particular, fully as well) by a first valve, and the second flow path by a second valve, so that an outflow of the mixed water from the spout can be controlled by means of the first valve and the second valve independently from one another. In this way, by means of preset positions of the first valve and/or the second valve, a (full or reduced) water flow through the first flow path and/or the second flow path can be permitted and/or prevented. To this end, the first valve can be located in the first flow path and/or the second valve can be located in the second flow path. In this way, the mixed water can be directed from the at least one mixing unit to the spout of the housing, in particular through the first flow path and/or the second flow path. The outflow of the mixed water from the spout of the fitting housing can thus be controlled independently by either the first valve or the second valve.

The first valve can be an electric valve, an electromechanical valve, or a solenoid valve. In particular, this means that the first valve can be electrically controllable. To this end the first valve can have, for example, a servomotor. The solenoid valve can be a valve that can be actuated by an electromagnet.

The first valve can be controlled by at least one sensor. The sensor can be an infrared sensor, a capacitive sensor, and/or a switch, for example. The sensor can be located directly on the housing of the fitting. In particular, the sensor can transmit a sensor signal to a controller, for example in the manner of a microprocessor, by means of which the first valve is controlled.

Furthermore, The sensor can be located outside the sanitary fitting. In this case, the sensor can be located on, for example, a water faucet, wash basin, sink, shower, or bathtub. In this way, the sensor can be placed in such a manner that, in particular, it is especially easy for a user of the sanitary fitting to reach. Nonetheless, oftentimes the sensor is located at least partially or completely inside the sanitary fitting.

Furthermore, The second valve can be a mechanical valve, a mixing cartridge, or a second mixing unit. In the case of a mechanical valve, activation or movement of the valve takes place (only) with a mechanism, which is to say, e.g., using levers, gear, pulleys, eccentrics, connecting rods, etc.

The second valve can be actuated with an actuator. The actuator can be located, in particular, on the fitting housing and can be operated by a user. The actuator makes it possible in particular to open and/or close the second valve. Moreover, a desired mixed water temperature can in particular also be selected by means of the actuator. The actuator can be, in particular, at least one lever and/or at least one handle. Moreover, the actuator is in particular located on the fitting housing.

The first valve and the second valve can be connected in parallel with one another and each in series with a first mixing unit.

A first mixing unit and the first valve can be connected in series and the first mixing unit and the first valve can be connected in parallel with the second valve.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
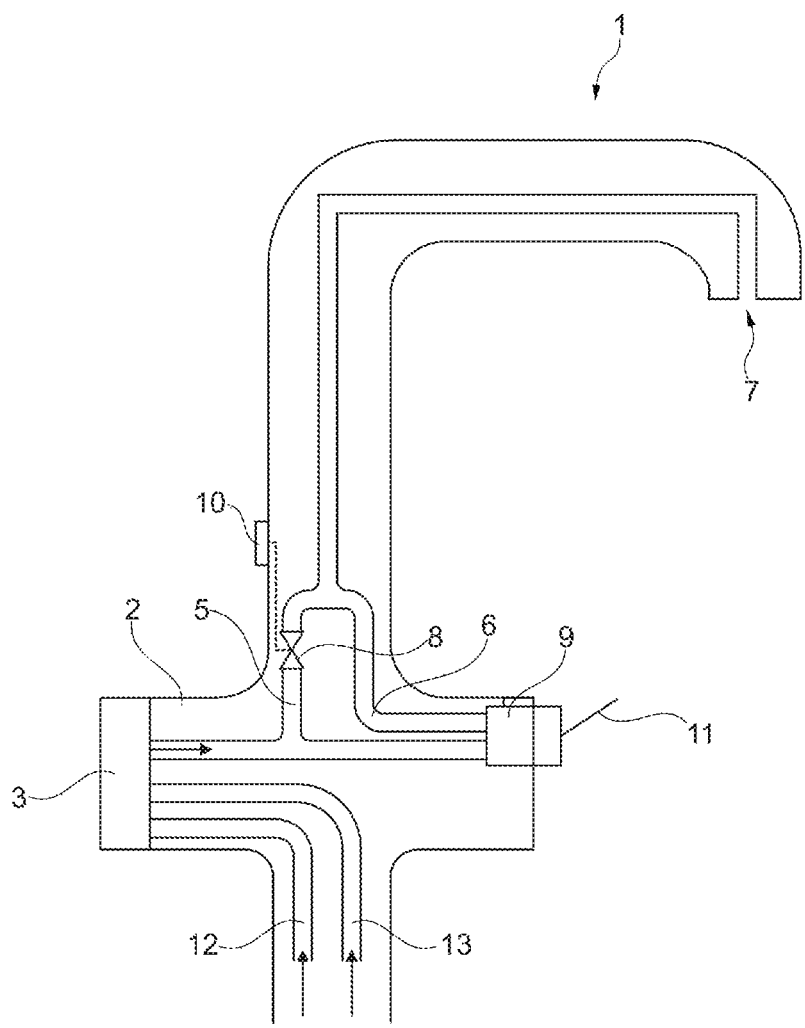
FIG. 1 illustrates an exemplary embodiment of the sanitary fitting.

FIG. 1 shows a sanitary fitting 1 with a fitting housing 2. The sanitary fitting 1 has a first mixing unit 3 that is supplied with cold water through a cold water inlet 12 cold water and with hot water through a hot water inlet 13. The first mixing unit 3 in this variant embodiment is a mechanical mixing valve. The cold water and the hot water are mixed in the first mixing unit 3 into a mixed water having a desired mixed water temperature. The mixed water mixed by the first mixing unit 3 can be directed through a first flow path 5 and a second flow path 6 to a spout 7 of the housing 2. The first flow path 5 can be at least partially closed by a first valve 8 and the second flow path 6 can be at least partially closed by a second valve 9. The first valve 8 and the second valve 9 are connected in parallel with one another and are each connected in series with the first mixing unit 3. The first valve 8 in this variant embodiment is a solenoid valve. The first valve 8 is connected in a data-carrying manner to a sensor 10, which is a capacitive sensor here. The second valve 9 in this variant embodiment is a mechanical valve that can be actuated with an actuator 11, which is implemented here by way of example in the manner of a lever. The outflow of the mixed water from the spout 7 of the fitting housing 2 can thus be controlled independently by the first valve 8 and the second valve 9.

Figure 2:
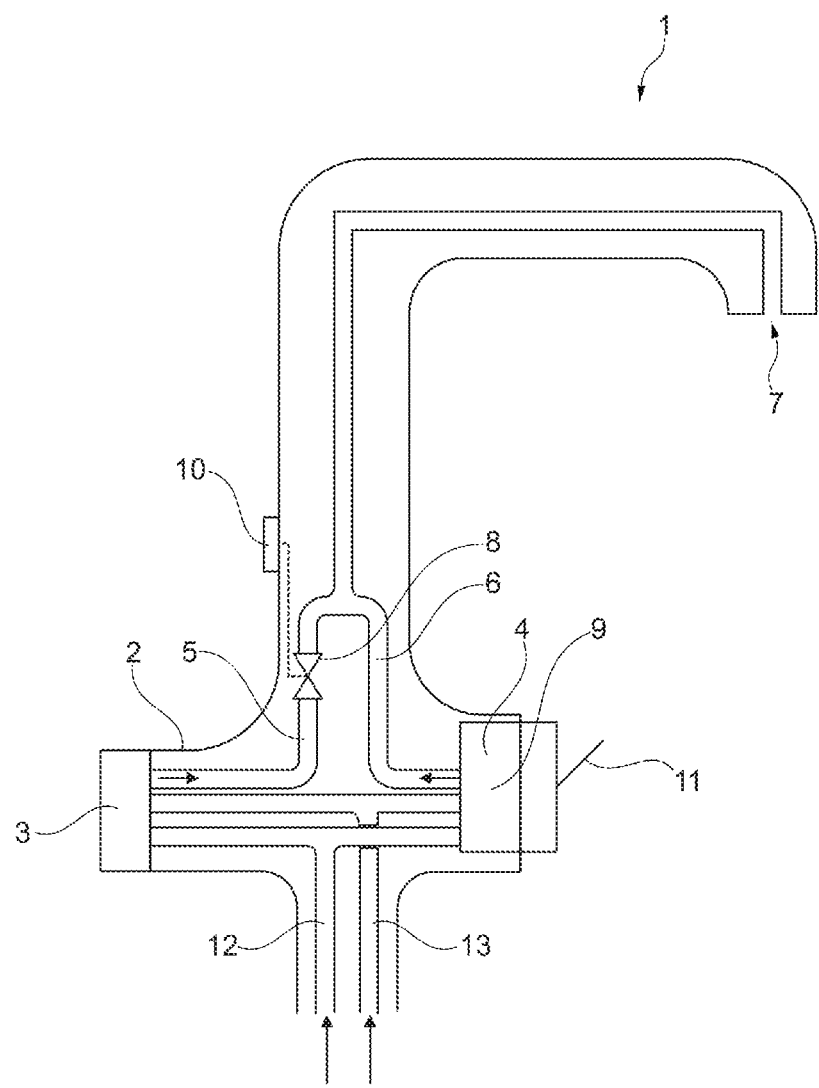
FIG. 2 illustrates an exemplary embodiment of the sanitary fitting.

FIG. 2 shows a sanitary fitting 1 with a fitting housing 2. The sanitary fitting has a first mixing unit 3 and a second mixing unit 4. The first mixing unit 3 and the second mixing unit 4 are each supplied with cold water through a cold water inlet 12 and with hot water through a hot water inlet 13. The cold water and the hot water are mixed into a mixed water having a desired mixed water temperature in the first mixing unit 3 and the second mixing unit 4 independently from one another. The mixed water mixed by the first mixing unit 3 can be directed through a first flow path 5 to a spout 7 of the fitting housing 2. Furthermore, the mixed water mixed by the second mixing unit 4 can be directed through a second flow path 6 to the spout 7 of the fitting housing 2. The first flow path 5 can be closed at least partially by a first valve 8. The first valve 8 is likewise a solenoid valve that is connected in a data-carrying manner to a sensor 10. The sensor 10 here is a capacitive sensor. The second mixing unit 4 has an integrated second valve 9 with which the second flow path 6 can be at least partially closed. The second valve 9 can be operated by a user of the sanitary fitting 1 by means of a lever 11. The first mixing unit 3 and the first valve 8 are connected in series. Moreover, the first mixing unit 3 and the first valve 8 are connected in parallel with the second valve 9 and the second mixing unit 4. In this way, an outflow of the mixed water from the spout 7 can be controlled by the first valve 8 and the second valve 9 independently from one another.

Figure 3:
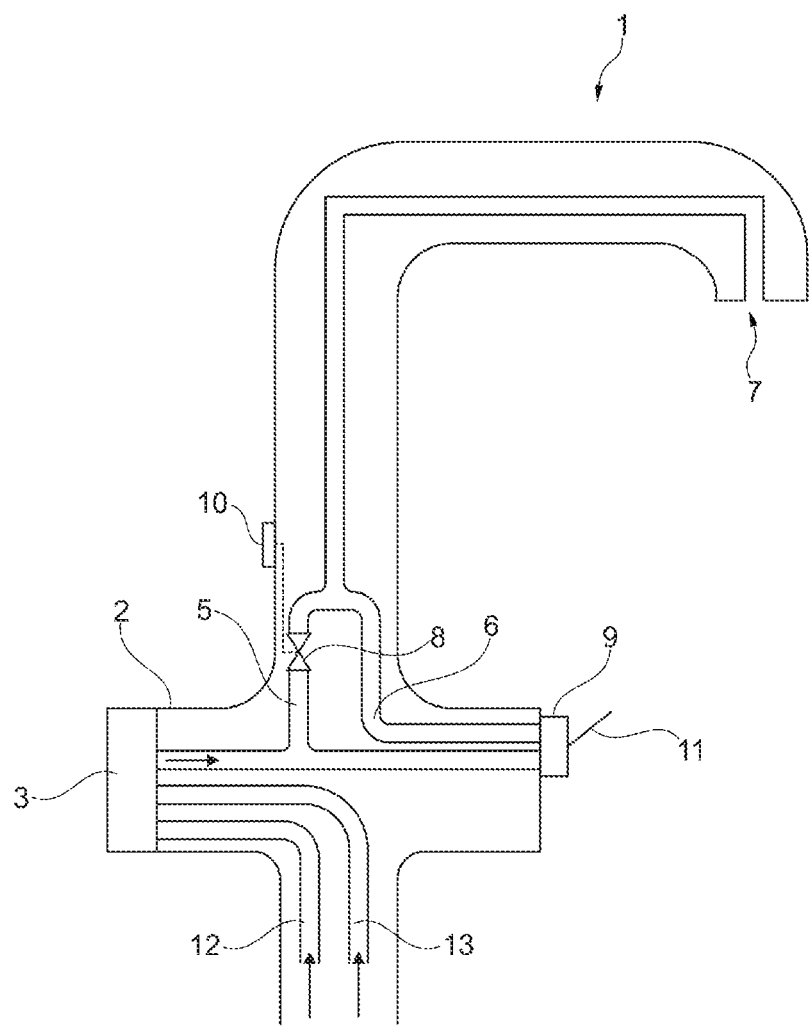
FIG. 3 illustrates an exemplary embodiment of the sanitary fitting.

FIG. 3 shows a sanitary fitting 1 with a fitting housing 2. The housing 2 has a first mixing unit 3 that is supplied with cold water through a cold water inlet 12 and with hot water through a hot water inlet 13. The first mixing unit 3 here is a thermostatic mixing unit in which the cold water and the hot water are mixed into a mixed water having a desired mixed water temperature. The mixed water can be delivered from the first mixing unit 3 through a first flow path 5 and a second flow path 6 to a spout 7 of the housing 2. The first flow path 5 can be at least partially closed by a first valve 8 and the second flow path 6 can be at least partially closed by a second valve 9. The first valve 8 is a solenoid valve that is connected in a data-carrying manner to a sensor 10. The sensor 10 here is a capacitive sensor. The second valve 9 is a mechanical valve that can be actuated by a user of the sanitary fitting 1 by means of a lever 11. The first valve 8 and the second valve 9 are connected in parallel with one another and are each connected in series with the first mixing unit 3. Thus in this variant embodiment as well, an outflow of the mixed water from the spout 7 can be controlled by the first valve 8 and the second valve 9 independently from one another.

The present invention is distinguished in particular in that an outflow of the mixed water can be controlled by two valves independently from one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sanitary fitting comprising:
   a housing with a first mixing unit for mixing a cold water and a hot water into a first mixed water and a second mixing unit for mixing the cold water and the hot water into a second mixed water, the first mixing unit and the second mixing unit mixing the cold water and the hot water independently from one another;
   a spout; and
   a first flow path adapted to facilitate flow of the first mixed water to the spout of the housing and a second flow path adapted to facilitate flow of the second mixed water to the spout of the housing, and
   wherein the first flow path is adapted to be at least partially closed by a first valve and the second flow path is adapted to be at least partially closed by a second valve so that an outflow of the first mixed water or the second mixed water from the spout is controllable by the first valve and the second valve independently from one another,
   wherein the first valve and the second valve are connected in parallel with one another and the first valve is connected in series with the first mixing unit and the second valve is integrated with the second mixing unit, and
   wherein a single cold water inlet and a single hot water inlet are provided within the housing, the cold water inlet dividing into a first cold water flow path that flows to the first mixing unit and a second cold water flow path that flows to the second mixing unit, and the hot water inlet dividing into a first hot water flow path that flows to the first mixing unit and a second hot water flow path that flows to the second mixing unit.

2. The sanitary fitting according to claim 1, wherein the first valve is an electric valve, an electromechanical valve, or a solenoid valve.

3. The sanitary fitting according to claim 1, wherein the first valve is controllable by a sensor.

4. The sanitary fitting according to claim 3, wherein the sensor is located outside the sanitary fitting.

5. The sanitary fitting according to claim 1, wherein the second valve is a mechanical valve.

6. The sanitary fitting according to claim 1, wherein the second valve is actuated with an actuator.

\* \* \* \* \*